Nov. 24, 1959 J. C. BONGIOVANNI 2,913,809

STRIP PROCESSING MECHANISM

Filed June 18, 1957 7 Sheets-Sheet 1

*INVENTOR.*
JOHN C. BONGIOVANNI
*BY*
Oberlin & Limbach
ATTORNEYS

Nov. 24, 1959 J. C. BONGIOVANNI 2,913,809

STRIP PROCESSING MECHANISM

Filed June 18, 1957 7 Sheets-Sheet 2

INVENTOR.
JOHN C. BONGIOVANNI
BY
Oberlin & Limbach
ATTORNEYS

INVENTOR.
JOHN C. BONGIOVANNI
BY
Oberlin & Limbach
ATTORNEYS

Nov. 24, 1959 J. C. BONGIOVANNI 2,913,809

STRIP PROCESSING MECHANISM

Filed June 18, 1957 7 Sheets-Sheet 4

INVENTOR.
JOHN C. BONGIOVANNI
BY
Oberlin & Limbach
ATTORNEYS

Nov. 24, 1959 J. C. BONGIOVANNI 2,913,809

STRIP PROCESSING MECHANISM

Filed June 18, 1957 7 Sheets-Sheet 5

INVENTOR.
JOHN C. BONGIOVANNI
BY
Oberlin & Limbach
ATTORNEYS

INVENTOR.
JOHN C. BONGIOVANNI
BY
Oberlin & Limbach
ATTORNEYS

INVENTOR.
JOHN C. BONGIOVANNI
BY
Oberlin & Limbach
ATTORNEYS

United States Patent Office 2,913,809

Patented Nov. 24, 1959

2,913,809

STRIP PROCESSING MECHANISM

John C. Bongiovanni, University Heights, Ohio, assignor to The Osborn Manufacturing Company, Cleveland, Ohio, a corporation of Ohio Application June 18, 1957, Serial No. 666,375

25 Claims. (Cl. 29—81)

This invention relates as indicated to a novel method and mechanism for processing elongated metal articles, and more particularly to a method of regularizing and surface beneficiating steel strip, sheet and the like. This application is a continuation-in-part of my co-pending application Serial No. 513,641, "Method and Mechanism for Processing Elongated Metal Articles," filed June 7, 1955.

The steel industry with its present hot rolling practice is confronted with a difficult problem of scale removal from the hot rolled steel before the latter can be further cold rolled or processed. Such scale or oxide on the usual low carbon hot rolled steel comprises three principal layers. The layer next to the steel is chiefly FeO or mixture of Fe and $Fe_3O_4$; the outer layer is composed chiefly of $Fe_2O_3$; and the intermediate layer which is relatively thick and not usually substantially attacked by sulphuric acid during pickling is composed chiefly of $Fe_3O_4$. The scale as a whole, however, after fracturing is not impervious to acid, and the present conventional practice for removing scale from hot rolled steel strip, rod and the like is pickling in sulphuric acid which is effective to penetrate to the parent metal underlying the oxide layers. It has long been recognized that such pickling operations are expensive, time- and space-consuming, and wasteful of materials. With the increasing strictness of anti-pollution laws, there is also increasing difficulty in disposing of the spent liquor.

Numerous efforts have been made in the past to remove scale by other methods including shot blasting and by power brushing. In Pecsok Patent 2,335,196 there is disclosed a method of scale removal wherein the steel strip is first passed between breaker rolls and subjected to a strong water spray before passing in engagement with power driven rotary brushes adapted to engage each side of the strip. This and certain other methods have been found effective to a degree in the removal of oxide scale from steel but the practical difficulty has resired in the fact that any method of scale removal to be adopted as regular steel mill practice, eliminating employment of pickling tanks entirely, must be substantially 100% reliable. In other words, it is not sufficient that a substitute method will remove a very large proportion of the scale or even all of the scale in certain special cases. Before the enormous advantages to be derived from elimination of the pickling process are to be realized, it is essential that the new mode of treatment be at least equally reliable in the removal of the scale. Power brushing represents an extremely attractive mechanical operation for employment in a scale removal line inasmuch as such brushing operation, when properly controlled and regulated, may also be utilized to beneficiate the metal surface in other respects and thereby afford a superior product. In order for such brushes to be fully effective in scale removal, however, it is necessary that means be provided effective preliminarily to fracture, loosen and otherwise prepare the scale for complete removal by the brush or brushes. The employment of scale breakers as suggested in the aforesaid Pecsok Patent 2,335,196 is obvious for such purpose, but unfortunately those previously known and used in steel mills have not proven fully adequate for the purpose. It is accordingly a principal object of my invention to provide novel mechanical means for flexing hot rolled steel strip and the like in a manner effective to prepare the same for complete removal of oxide scale therefrom by the subsequent action of properly selected and arranged power driven rotary brushes.

A further object is to provide a novel roll stand for flexing the work about a relatively small radius, the rolls being mounted, driven and continuously acted upon in a manner to maintain their uniformly effective cooperative action on the strip.

Still another object is to provide such method and mechanism whereby the scale being fractured is subjected both to tension and to compression strains.

Another object is to provide novel strip processing mechanism including special mounting and supporting means for a roll of relatively small diameter about which the work is to be flexed so that such small roll may resist the forces to which it is subjected in use.

A still further object is to provide such roll stand wherein such small diameter roll is positioned and confined between two larger work rolls cooperating therewith.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 10:
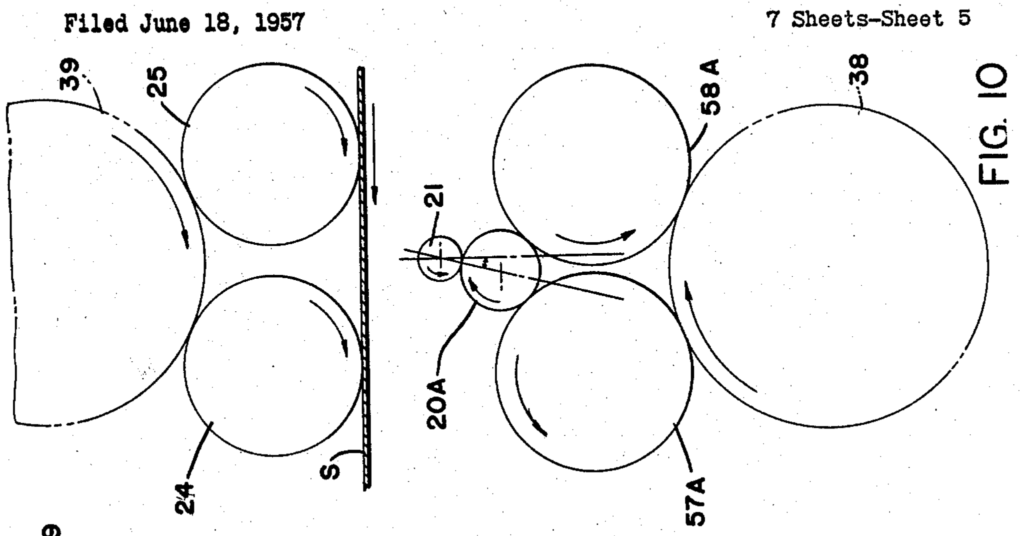
Figure 9:
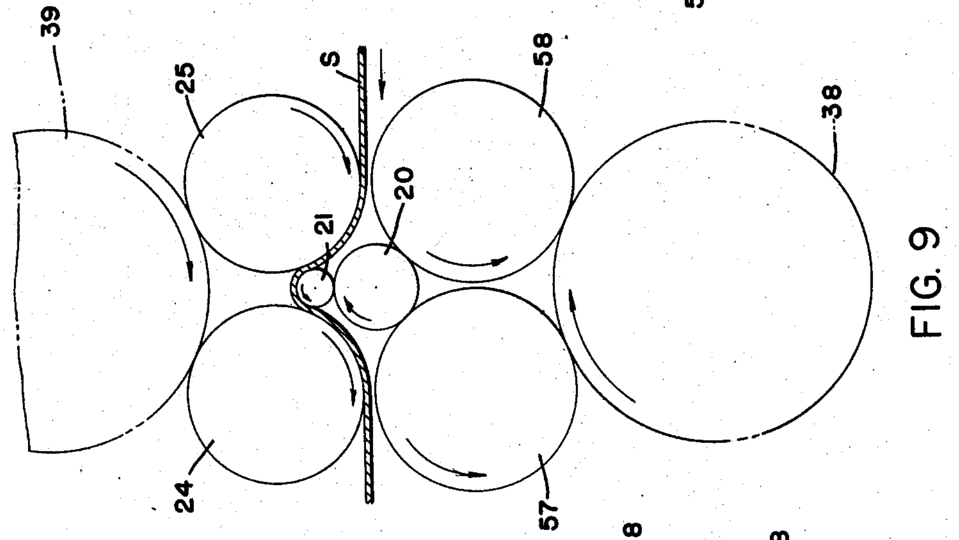
Figs. 8 and 9 show a six-roll arrangement affording improved drive and support to the small work roll.
Figure 8:
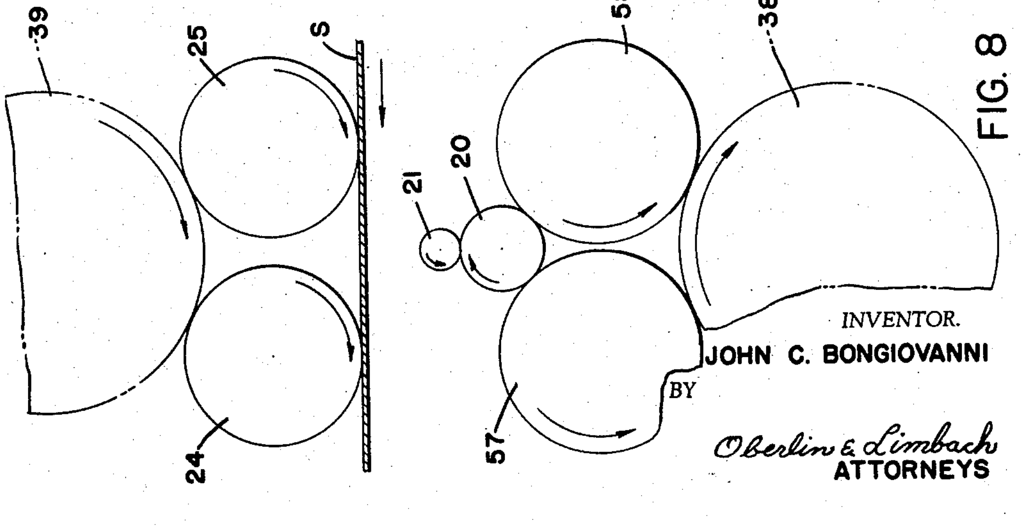
Figure 12:
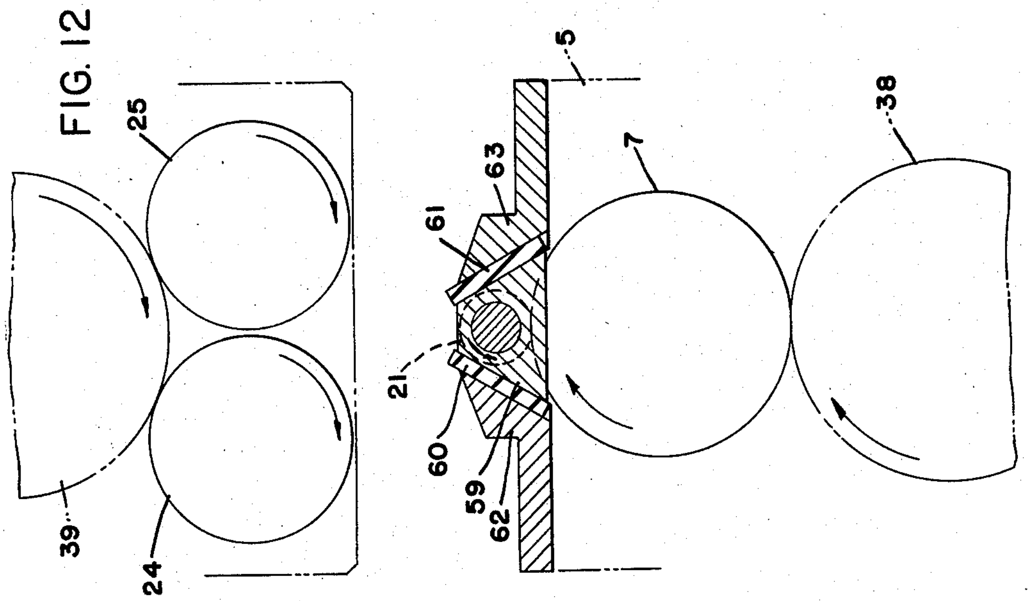
Figure 11:
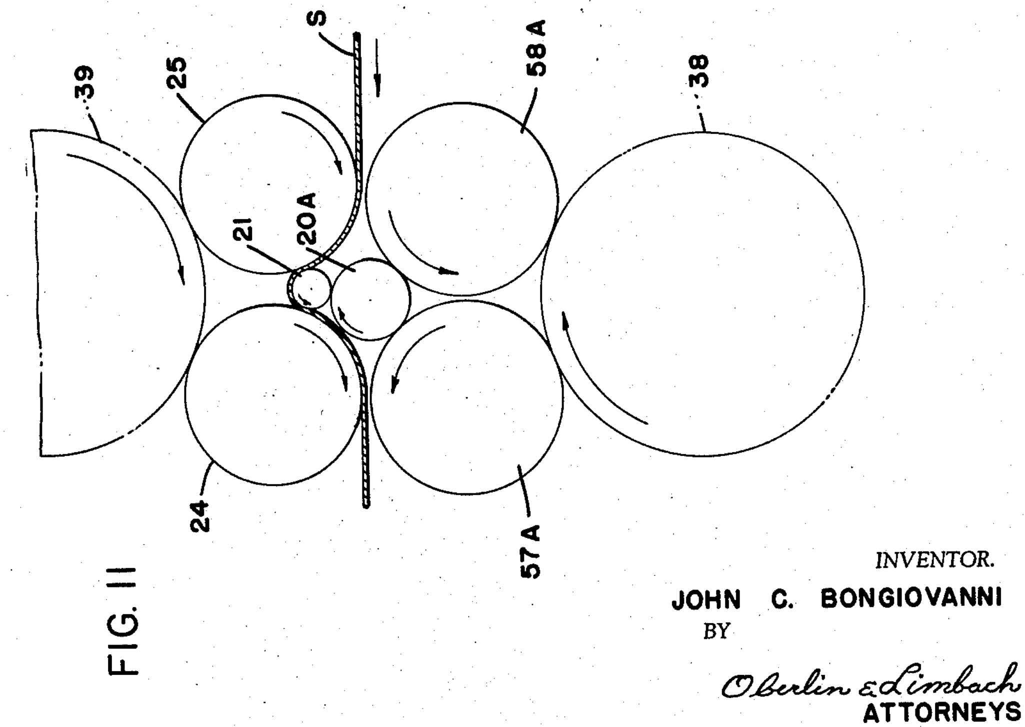
Figure 14:
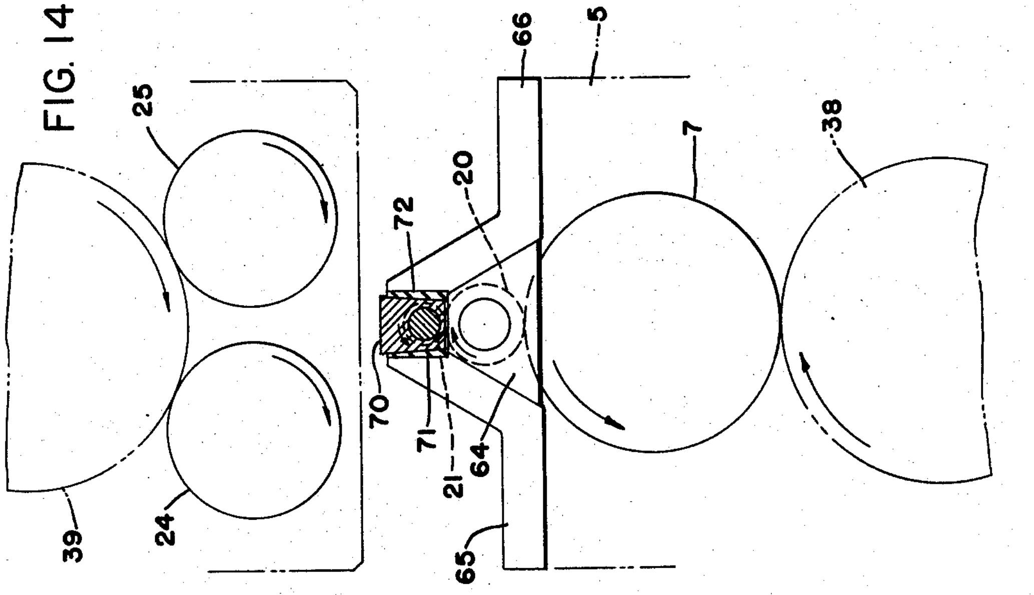
Figure 13:
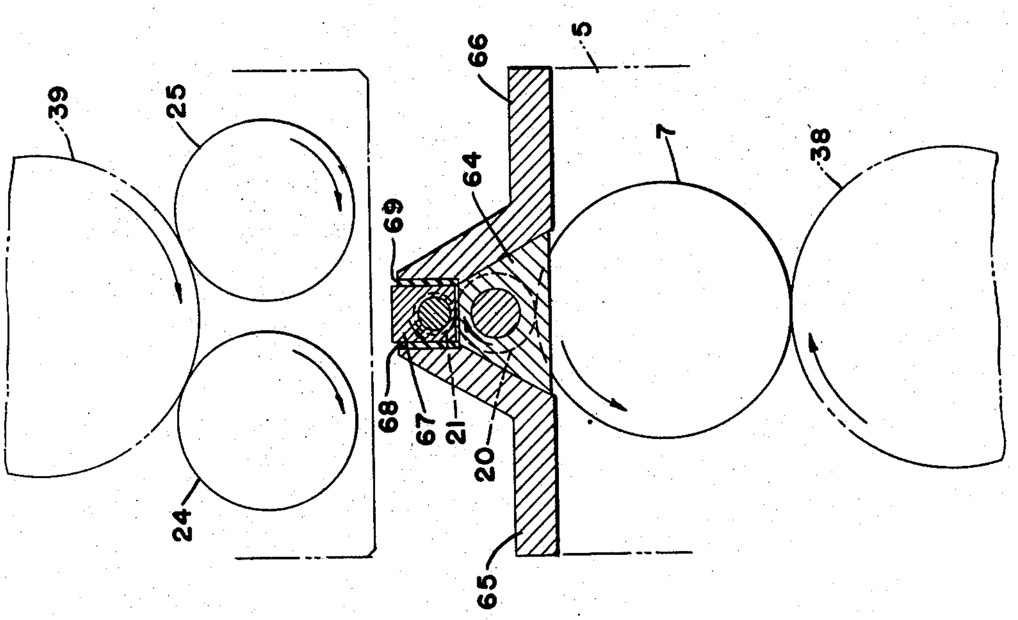

Figs. 10 and 11 show a six-roll arrangement similar to that of Figs. 8 and 9 but with the back-up means for the small work roll offset in the direction of travel of the strip; and Figs. 12, 13 and 14 show means for cushioning the bearings of the small work roll.

Figure 1:
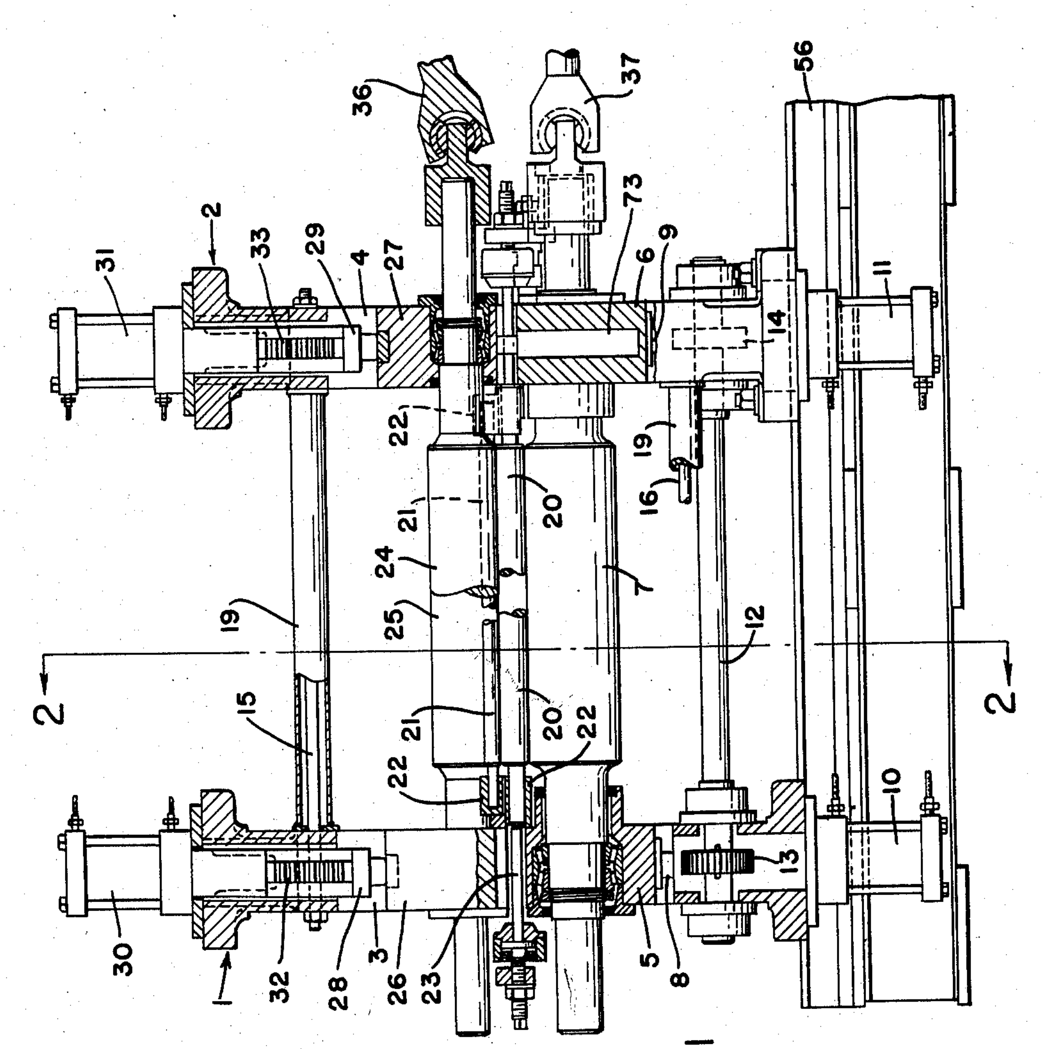
Fig. 1 is a front elevation of a novel roll stand embodying the principles of my invention partly broken away better to disclose the internal construction thereof.
Figure 2:
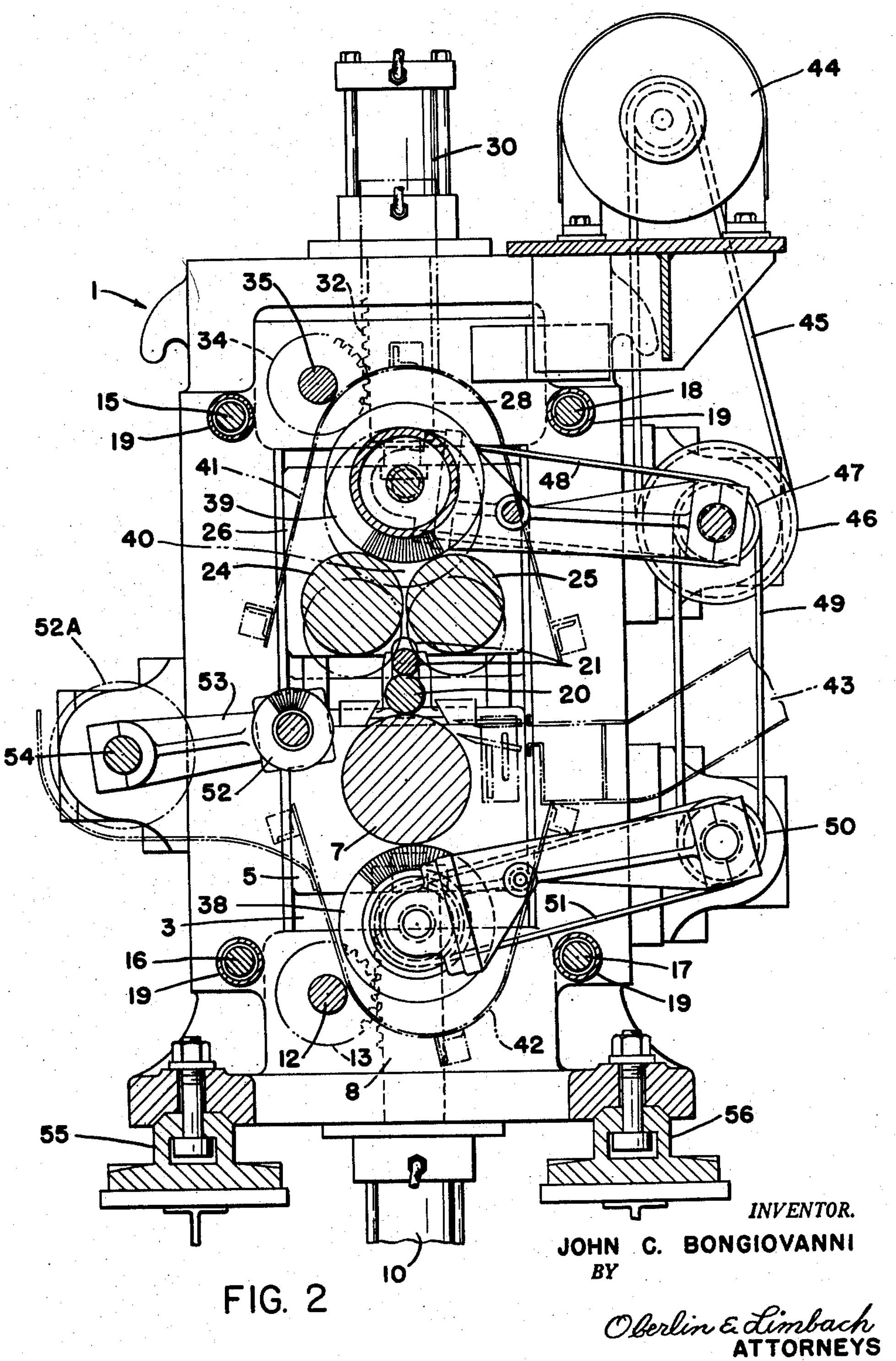
Fig. 2 is a vertical transverse section taken on the line 2—2 on Fig. 1.

Referring now more particularly to said drawing and especially Figs. 1 and 2 thereof, it will be noted that such figures are generally comparable to Figs. 1 and 2 of my aforesaid prior application Serial No. 513,641, and further reference may be had to such prior application for details of the preferred drive means and the like which are not per se a part of the present invention.

Two spaced stands 1 and 2 are provided having windows 3 and 4 therein within which are mounted slides 5 and 6 respectively journalling a large lower back-up roll 7. Such slides or bearing blocks are carried by the pistons 8 and 9 of double-acting hydraulic cylinders 10 and 11, such reciprocation of the bearing blocks being synchronized through the action of torsion bar 12 having pinions 13 and 14 keyed thereto engaging racks (not shown) on such pistons. Roll 7 as well as the rolls described below may be of SAE-52100 hardened alloy steel, for example, mounted in totally enclosed bearings provided with grease lubrication and having neoprene or equivalent grease seals. Keeper plates (not shown) retain the bearing blocks or slides in place and may be shifted to permit endwise removal of such bearings and associated rolls when required.

Four tie rods 15, 16, 17 and 18 connect the two strands 1 and 2 under tension, such tie rods being enclosed within tubular spacer members such as 19.

A much smaller back-up roll 20 is journalled directly above main back-up roll 7 in position to engage the latter and also a superimposed and still smaller work roll 21, the ends of rolls 20 and 21 being journalled in bronze bearings such as 22 supported in recesses in the upper surfaces of main slides or bearing mounts 5 and 6 whereby a degree of vertical movement of such rolls 20 and 21 relative to back-up roll 7 may be obtained. The respective ends of the smaller back-up roll 20 are engaged by thrust bearings such as 23 which are adjustable in order properly to locate rolls 20 and 21 and accordingly such latter rolls may be precisely positioned axially but are mounted to float vertically. Neither roll 20 nor roll 21 has any drive of its own and such rolls are rotated only through engagement of roll 20 with driven back-up roll 7 and engagement of work roll 21 with the traveling work as later described.

Figure 4:
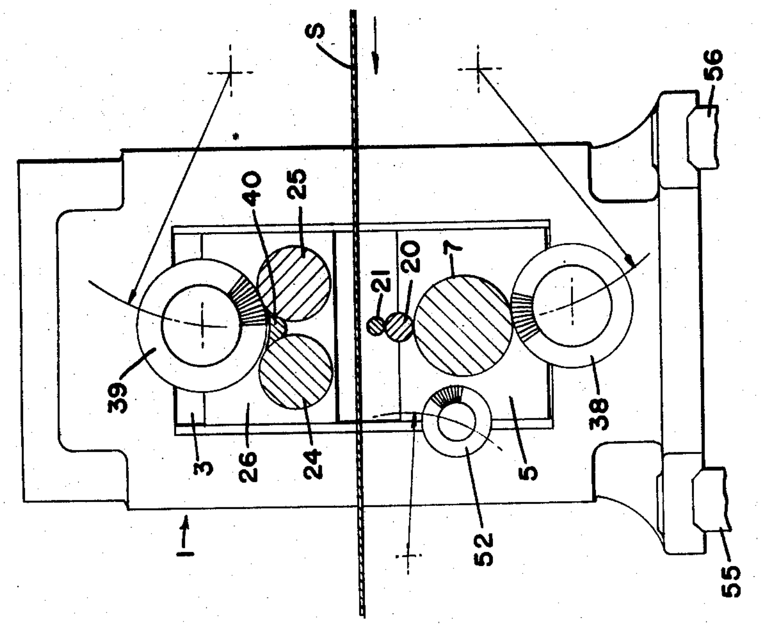
Fig. 4 is a view similar to Fig. 3 but showing the rolls retracted away from the pass line out of strip engaging position.
Figure 3:
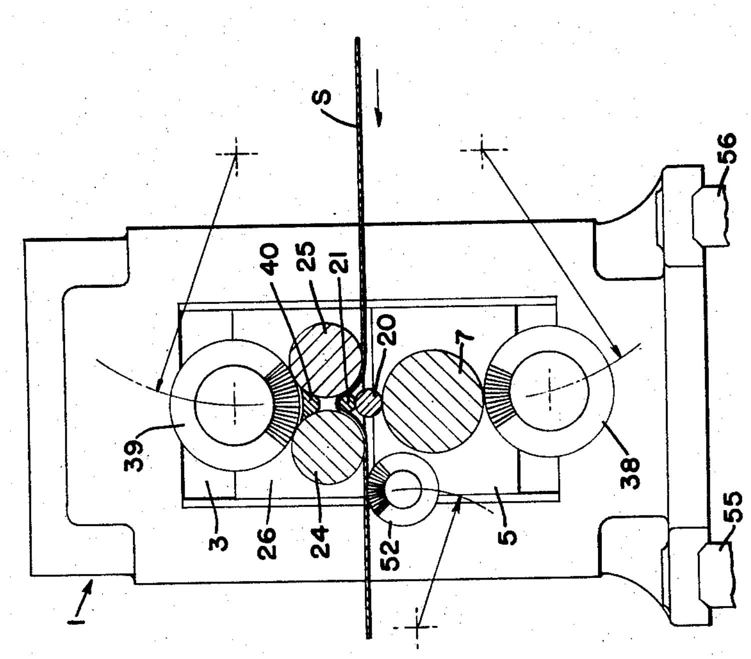
Fig. 3 is a semi-diagrammatic transverse section generally similar to Fig. 2 illustrating the processing of the continuously advancing metal strip.

A pair of upper work rolls 24 and 25 are journalled in upper slides or bearing blocks 26 and 27 adapted to be reciprocated vertically within windows or slideways 3 and 4 respectively. Such slides or bearing blocks are carried by pistons 28 and 29 respectively adapted to be reciprocated by double-acting cylinders 30 and 31, synchronism of such reciprocation being assured by racks 32 and 33 on such pistons adapted to engage pinions such as 34 on a pinion shaft 35 journalled in the respective stands in the same manner as pinion shaft 12. It is accordingly obvious that through reciprocation of bearing slides 26 and 27, rolls 24 and 25 may be forced downwardly toward work roll 21, the latter being directly supported by back-up roll 20 and ultimately supported by large power driven back-up roll 7. Work rolls 24 and 25 are much larger than work roll 21 and are asymmetrically disposed relative to the latter with the axes of rolls 24 and 25 lying in a horizontal plane. As illustrated in Figs. 3 and 4, the work such as steel strip S is threaded between the lower work roll 21 and upper work rolls 24 and 25 (Fig. 4) whereupon slide 5 may be elevated and slide 26 depressed to bring work roll 21 entirely between upper work rolls 24 and 25 so that the strip S is forced to conform to a portion of the arcuate surface of small roll 21.

Upper work rolls 24 and 25 are driven in unison from an electric motor (not shown) through drive means such as 36 in a manner described more in detail in my prior application Serial No. 513,641 to which reference may be had. Lower back-up roll 7 is driven from a different electric motor (not shown) through drive means 37 independent of such drive means for rolls 24 and 25 so that it is possible to vary the rotation of roll 7 relative to that of rolls 24 and 25.

In order to prevent the build-up of scale particles on the several rolls, I provide a cylindrical power driven rotary brush 38 mounted to engage the underside of back-up roll 7 and a similar brush 39 mounted to engage the upper surfaces of both rolls 24 and 25 (see Figs. 2, 3 and 4). A bronze bar 40 is interposed between the upper portions of rolls 24 and 25 shaped to conform to the arcuate surfaces of the same and also to the outer peripheral surface of brush 39. Such bar is recessed sufficiently to permit brush 39 to engage rolls 24 and 25 but is effective substantially to prevent scale particles dislodged by such brush from dropping downwardly between rolls 24 and 25 onto the upper surface of strip S. It will preferably be firmly secured to the respective end slides 26 and 27.

An inverted U-shaped sheet metal housing 41 may be provided to enclose brush 39 and rolls 24 and 25 and a U-shaped housing 42 may enclose lower brush 38 with a suction exhaust duct 43 leading therefrom to carry away scale particles and debris, and/or suction means of the type illustrated and described in my aforesaid prior application Serial No. 513,641 may be employed.

Rotary brush 39 is driven from electric motor 44 through belt 45, pulley 46, pulley 47 and belt 48. Brush 38 is similarly driven through an extension of such drive means including belt 49, pulley 50 and belt 51. These brushes are desirably carried on swinging arms to permit their being conveniently swung out of the way when it is desired to inspect the rolls, etc.

I very much prefer that two roll stands of the type described above be employed in sequence to produce the traveling strip, the rolls of the second stand being inverted relative to the rolls of the first stand so that the work will be flexed in the opposite direction. A third rotary brush 52 may be desirably be provided to engage the underside of the strip S as shown in Fig. 3, being carried by arm 53 mounted on rotatable horizontal shaft 54. Such brush may be swung down out of engagement with the strip as shown in Fig. 4 when slide 6 is lowered to retract small work roll 21 out of operative engagement with the work. Oscillation of shaft 54 and arm 53 may be controlled by a hydraulic oscillating motor that operates through a fixed arc (see my aforesaid application Serial No. 513,641, and roll 69 of Fig. 3) to cause idler brush 52 to bear against the work much like a dancing roll. Such brush helps remove any loose scale still adhering to the work and also deflects the strip back to the generally horizontal pass line. A second idler brush 52A may be mounted for rotation on shaft 54 to support the strip as it leaves the stand and to assist in detaching loose particles of scale and the like adhering thereto. The roll stand will desirably be mounted on ways 55 and 56 to permit adjustment of the same transversely of the line, and it will be understood that such stand will ordinarily be included in a strip processing line of the general type shown and described in my aforesaid prior application Serial No. 513,641, the strip being subjected to the action of power driven rotary brushes at subsequent brushing stations completely to remove the scale, slivers and the like loosened and made susceptible to such brushing action through the previous operation thereon of the roll assemblies comprising the subject matter of the present invention.

Figures 5, 6, 7:
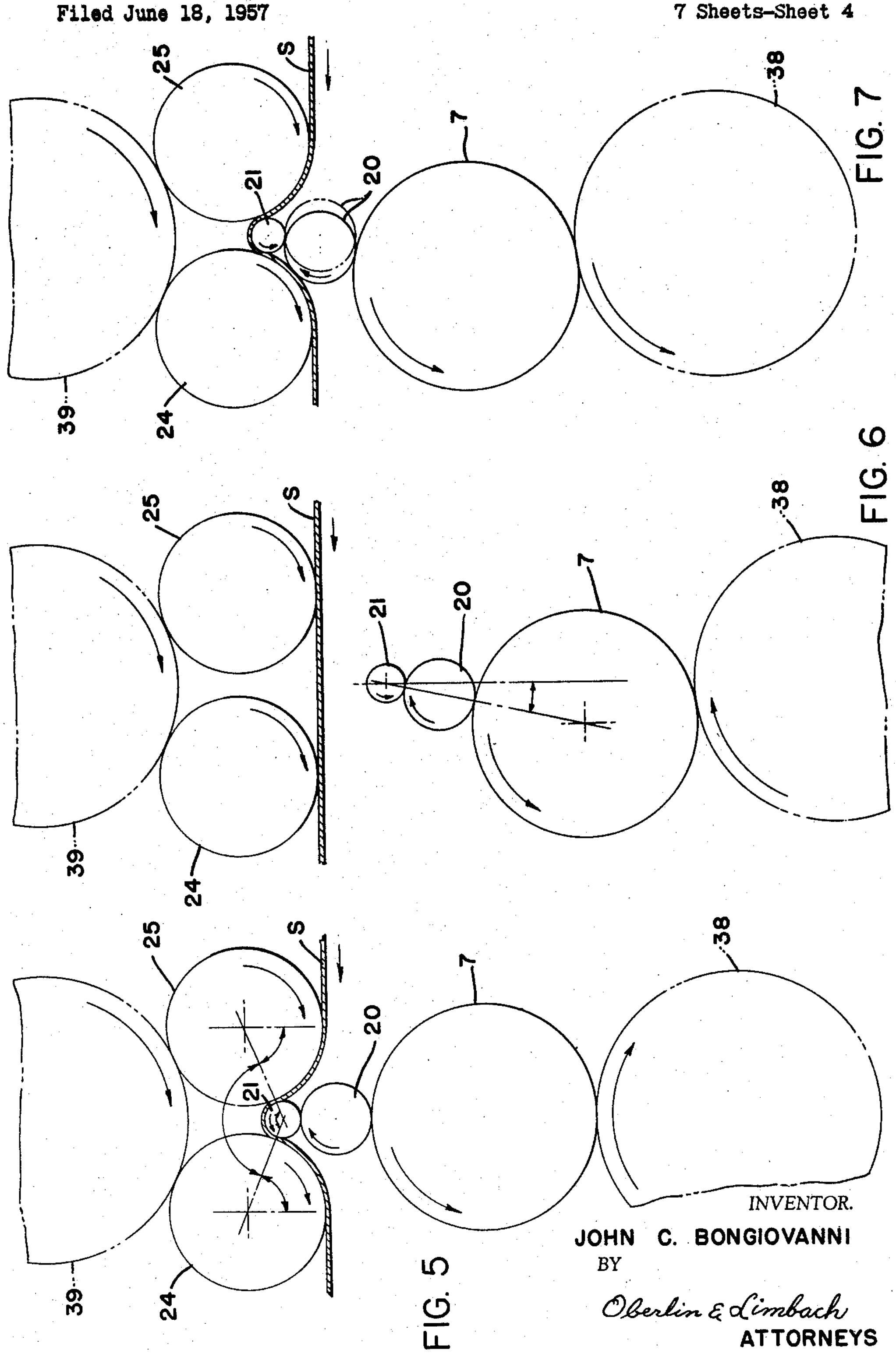
Fig. 5 is an enlarged detail view showing the cooperative relationship of the several rolls when in operative position as shown in Fig. 3.
Figs. 6 and 7 shows a modified five-roll arrangement in which the back-up rolls for the small work roll are offset in the direction of travel of the strip, Fig. 6 showing such small roll retracted from operative position and Fig. 7 showing such roll advanced into operative position.

Referring now more particularly to Fig. 5 of the drawing, it will be seen that the strip S is engaged by roll 25 through an arc of contact of approximately 70° and that such strip is likewise engaged by roll 24 through an arc of contact of approximately 70°. The strip engages the small work roll 21, on the other hand, through an arc of contact of approximately 140°, being ordinarily forced to conform to the surface of such latter work roll.

Referring now to Figs. 6 and 7, a modified arrangement of the lower roll assembly, 7, 20, 21, is illustrated wherein the centers of back-up rolls 20 and 21 are offset from vertical alignment therewith in the direction of travel of the strip so that the centers of the three rolls lie on a line about 12° from the vertical. When lower slide 6 is now elevated to bring work roll 21 into operative position as illustrated in Fig. 7, such small work roll 21 tion. After passing through another duster stand to remove any loose particles adhering to the surface of the strip, the latter passes through a leveler before passing through another duster stand and a slitter. The slit strip may thereafter be conducted through power brushing stands of the type disclosed in application Serial No. 491,992 of Ruben O. Peterson, filed March 3, 1952, entitled "Reciprocating Surface-Finishing Mechanism and Method." The brushes of such latter stands are effective to remove burrs from the slit strip edges and to surface-beneficiate such strip so that when wound on a coiler, the strip will have been completely de-scaled, cleaned, slit and finished in a single continuous line. It will, of course, be fully understood that the line just described is for the purpose of illustration only and that the roll stand of the present invention may be employed in conjunction with a wide variety of other devices.

My new strip flexing and working apparatus is of particular utility in preparing low carbon and alloy steel strip for further treatment by high speed power driven rotary brushes. The strip will ordinarily be caused to travel at a speed of from 30 to 200 feet per minute and scale removal brushes may be driven at about 8300 surface feet per minute, for example. Hard crimped steel wire brush bristle material will usually be employed for this purpose, wire of .0118 inch diameter being suitable. Granular abrasive may be fed to the brushes either externally or internally as described in Peterson Patent 2,680,938, for example. The use of such abrasive, e.g. "Aloxite" (aluminum oxide), "Carborundum" and the like, is especially advantageous when brushing titanium strip which tends to adsorb hydrogen, nitrogen and oxygen during its formation to produce a hard superficial layer desirably removed by my new treatment. Aluminum and high carbon steel strip also often may be much improved by such treatment.

The employment of my new roll stands in a brushing line of the general type described above, instead of a conventional pickling operation ordinarily employed in the removal of scale from strip and the like, has numerous advantages over such pickling operation including the fact that there is little or no loss of virgin metal by brushing as compared with from ½% to as much as 2% metal loss often experienced during pickling. A brushing line of the general type referred to will ordinarily occupy less than one-half the space required by a pickling line. The pickling acid fumes are highly corrosive in the building and associated equipment and also make for unhealthful working conditions. Whereas the brushing line may be continuously maintained with only very brief periods of down time, a pickling line must periodically be completely shut down for relatively long periods to permit substantial replacements and repairs. The cost of the pickling acids, commonly sulphuric acid, has in the past fluctuated considerably more than has been the case with suitable brushing materials. Not only is the supply of sulphuric acid sometimes a problem, but also the large quantities of water necessary are becoming steadily more difficult to obtain, especially reasonably clean water which will not leave objectionable residues. Whereas the waste disposal problem of a pickling line is serious and becoming steadily more so due to the imposition of anti-pollution laws, the scale removed by a brushing line is easily salvaged and becomes a valuable source of powdered metal for use in powder metallurgy. It is also useful as an abrasive and as a chemical. The installation cost of a scale removal line of the general type disclosed herein may be as low as approximately one-third that of a continuous pickling line having the same production capacity.

Not only are there very important operating advantages arising from the employment of my new apparatus and process, but also the finished work is much superior to that obtainable from a conventional pickling line. More particularly, the brushing action, properly controlled, serves to beneficiate the metal surface by removal of minute splinters, the blending of sharp edges of pits, other surface irregularities and strip margins, and the production of a very clean, dry finish which does not tend to rust quickly. Despite the washing steps employed after acid pickling, it is not practical to remove all minute traces of acid, salts and water-borne dirt from the metal surface, and consequently the pickled surface is not clean and is highly susceptible to rusting. The pickling process actually tends to produce and accentuate objectionable pits in the surface in which salts collect and a certain amount of hydrogen may be absorbed by the metal surface with consequent local weaknesses and embrittlement.

One of the more important features of my new invention is the provision of means for mounting and supporting the small work roll so that such roll may be of unusually small diameter and accordingly the work may be relatively sharply flexed about a small radius. Furthermore, good control is had over the strip during such flexing operation and the strip is caused to conform closely to the surfaces of the respective work rolls for distances of very substantial arcuate extent.

Scale or oxide which is fractured loose from the material being processed and which then drops onto the rolls actually serves as an aid in driving such rolls when only a thin film or coating of the oxide is permitted to accumulate, the roll cleaning brushes being effective to prevent any substantial build-up which would alter the contour or effective dimensions of the rolls. It may be desirable to provide slight crowns on the two larger work rolls 24 and 25 and also on intermediate back-up roll 20 to ensure proper tracking of the strip and to prevent strip wobble. The larger work roll on the strip exit side of the machine should rotate at a slightly greater speed (surface feet per minute) than the associated large work roll inasmuch as sufficient scale will have been removed by the time the strip reaches the roll at the exit side slightly to lessen the effective gauge of such strip. This objective may desirably be achieved by driving the two work rolls at the same rate of rotation from the same power source but making the larger work roll on the strip exit side of the machine of very slightly greater diameter than the other large work roll so that its surface speed will be about 1% to 2% greater. The large back-up roll 7 will be driven at a rate to drive the small work roll 21 at the same speed as the large work roll at the entry side of the machine. Such small work roll 21, of course, has no positive drive means of its own and is mounted so as to be quickly and conveniently removable. It may be exchanged for another roll of somewhat different diameter without the necessity of changing any of the other rolls in the stand.

In addition to removing a large portion of the scale, the abrupt reverse bending of the strip regularizes the metal structure to a considerable extent and superficially work-hardens the strip a little although not enough to prevent the metal from still drawing well. Not only does such abrupt reverse bending exert large edgewise compressive forces on the scale layers, but it also serves to cause minute slivers in the surface to stand up in a manner rendering them more amenable to the subsequent brushing operation.

The power driven rotary brushes 38 and 39 serve to prevent any substantial build-up of scale particles on the rolls which would be detrimental to the operation of the machine, and the bronze shoe 40 fitting between rolls 24 and 25 not only serves to prevent particles dislodged by brush 39 from dropping down between rolls 24 and 25 upon strip S but also may serve somewhat as a scraper.

The small work roll 21 will ordinarily be driven at substantially the same rate of surface feet per minute as the opposed larger work rolls, it being recalled that the larger work roll on the exit side will be turning at a slightly greater surface f.p.m. rate than the other large work roll. The larger work rolls serves to deflect the is now supported by a back-up roll 20 and through it by large back-up roll 7 in a direction better to resist the forces applied against such small work roll 21 taking into account the tension on strip S as it is pulled through the assembly.

In Figs. 8 and 9 a modified arrangement is shown where instead of the single large back-up roll 7, two large back-up rolls 57 and 58 are provided for intermediate back-up roll 20 with the lower rotary brush arranged to engage the surfaces of both rolls 57 and 58. The two back-up rolls 57 and 58, of equal diameter, thus cradle intermediate back-up roll 20 and both such rolls 57 and 58 will desirably be power driven in unison, adding further rigidity to the small back-up roll 20 when in operating position (Fig. 9), this being very desirable when processing very thin strip since it is then important to employ a very small diameter lower work roll 20 which may, for example, have a diameter of from about ¾ inch to 1½ inches. A better and more positive drive of small back-up roll 20 is likewise achieved due to the two lines of driving contact afforded by back-up rolls 57 and 58. Substantial tension should be maintained in the strip as it is pulled through the roll assembly to avoid cobbles. The work roll 21 is of such small diameter that it is completely enclosed between rolls 24 and 25 in the region between the horizontal plane of the pass line of strip S and the horizontal plane through the axes of the two large work rolls 24 and 25. The axis of the small back-up roll 20 is within the region bounded by the plane of the material pass line and the plane through the axes of the two large back-up rolls 57 and 58. This roll arrangement permits large driving arcs of contact between the large work rolls 24 and 25 and the material being processed, consequently reducing the vertical pressure between the rolls above the pass line and the rolls below the pass line.

Figs. 10 and 11 show an arrangement of the rolls generally comparable to that of Figs. 8 and 9 discussed above but with the small back-up roll 20A having its axis offset somewhat in the direction of travel of the strip S, the small work roll 21, however, still being in the same relationship to large work rolls 24 and 25 as before, namely having its axis in a vertical plane midway between vertical planes including the axes of such two latter work rolls. The axis of small back-up roll 20A may be thus offset so that a plane including the axis of such roll and small work roll 21 will lie at an angle of about 12° to such vertical plane including the axis of small work roll 21. Of course, this means that the axes of large back-up rolls 57A and 58A will likewise be somewhat laterally offset in the direction of travel of the strip in order properly to support small back-up roll 20A, but the direction of the force exerted on small back-up roll 20A is such that the axes of large back-up rolls 57A and 58A may still lie in the same horizontal plane. Back-up rolls 57A and 58A will ordinarily be of the same diameter and accordingly power driven in unison. When the work rolls are moved into operative position as shown in Fig. 11, it will be apparent that small work roll 21 is now somewhat better supported to resist the forces to which it is subjected in use, having in mind the tension exerted on the strip S as it travels from right to left as viewed in such figure to cause such strip to pass through the roll assembly. Lateral deflection of small work roll 21 is effectively prevented. As before, the small work roll is entirely enclosed between the large work rolls 24 and 25, lying entirely between the plane of the main strip pass and a plane defined by and including the axes of large work rolls 24 and 25. The arrangement also affords superior drive for the small work rolls 21, it being kept in mind that it is driven through engagement with small back-up roll 20A which in turn is driven by engagement with power driven large back-up rolls 57A and 58A. The small work roll 21 lies entirely within the region demarked by the arc of contact of such roll with strip S and the arcs of contact of work rolls 24 and 25 with strip S.

Figs. 12, 13 and 14 illustrate arrangements for journalling the small work roll 21. In Fig. 12, a four-roll assembly is illustrated (in open position) with the large back-up roll 7 directly engaging and supporting small work roll 21 (see my prior application Serial No. 513,641). The large work rolls 24 and 25 are only very slightly spaced from each other, and this assists in preventing the material being processed from getting up between such rolls and causing a cobble. On each side of the small work roll bearing 59, bearing cushions 60, 61 of resiliently deformable material such as rubber, nylon and cord with rubber are provided firmly clamped in place by removable bearing supports 62 and 63 mounted on top of lower slide or chock 6. The cushions 60 and 61 permit the bearings of the small work roll 21 to move sidewise slightly when variation occurs in the thickness, hardness or tension control of the material being processed. Consequently, undue stress on roll 21 is avoided.

In Fig. 13, the five-roll arrangement is illustrated corresponding to the arrangement shown in Fig. 1, for example. The upper work rolls 24 and 25 are shown somewhat more spaced apart to permit a greater deflection loop in the material being processed when the rolls are in operating position. The bearing 64 for the small non-driven back-up roll 20 is held in place between bearing supports 65 and 66 removably secured to the top of lower slide or chock 5, and such supports extend upwardly to embrace and position small work roll bearing 67. It will be seen that such latter bearing is slightly spaced above bearing 64 inasmuch as roll 21 rests directly upon back-up roll 20. Similarly, bearing 64 is slightly spaced above the top of chock 5 inasmuch as roll 20 rests directly upon and is supported by large power driven back-up roll 7. Straight-sided bearing cushions 68 and 69 are provided on each side of the small work roll bearing 67 to serve a purpose comparable to that of cushions 60, 61.

The arrangement shown in Fig. 14 is generally similar to that of Fig. 13 except that a downward taper is provided on the sides of the small work roll bearing 70, and the bearing cushions 71 and 72 are tapered in complementary fashion in an upward direction. This arrangement facilitates removal of the bearings 70 together with the small work roll 21.

As explained above, the lower pistons 8 and 9 (Fig. 1) are operative to elevate chocks 5 and 6, and pistons 28 and 29 bear down on upper chocks 26 and 27. It is thus possible to bring the work rolls into desired operative relationship after the work has been threaded through the pass. Means are also provided resisting movement of the upper and lower chocks toward each other so that when the pressure on the aforementioned pistons is relieved, such chocks will thereupon be caused to move apart and carry their respective work rolls out of operative relationship. Such means will normally comprise piston-cylinder assemblies such as 73 supported in the lower chocks 5 and 6 with their pistons projecting upwardly to engage the corresponding upper chocks 26 and 27.

The mechanisms of the present invention are intended to be employed in continuous strip processing lines and the like in the general manner described in my aforesaid prior application Serial No. 513,641 to which reference may be had for further details. Thus, the metal strip S may be taken from a coil resting on an uncoiler and passed between power driven cylindrical rotary brushes to remove any loose scale, dirt, etc., on the upper and lower surfaces of the strip. The strip is then conducted through a stand of the type illustrated and described herein, between upper and lower power driven brushes in a duster stand and then through a second roll stand similar to the first one except that the arrangement of the rolls therein is inverted to flex the strip in the opposite direcstrip about the smaller roll but preferably do not act to pinch or reduce the strip. The rolls should, of course, be longer than the width of the strip processed and if non-flat rod is to be processed, the rolls may be appropriately grooved to receive and guide the same.

It has been found that metal strip processed through roll stands of the type disclosed above and subsequently subjected to the indicated power brushing stages is quite superior to ordinary strip for many purposes. Thus, for example, hot rolled steel strip thus flexed and brushed was found to be much superior to commercially available cold rolled steel strip for the manufacture of butt welded pipe. The hot rolled strip was more readily formed into the tubular blank and a more uniform electric resistance weld was obtained which withstood the usual tests to which such pipe is normally subjected better than did comparable butt welded pipe formed from cold rolled steel strip.

The steel strip approaching the roll stands is generally under relatively little tension although there is ordinarily a certain amount of back tension in order to keep the strip from wandering as it is uncoiled. The strip leaving the roll stand should likewise be under a certain amount of tension sufficient to assist the stand in delivering the strip. Moreover, it is important that the strip be under tension on the exit side of the stand thus to assist in propelling the same as soon as the rolls of the stand commence to rotate since if the rolls should turn relative to the strip while in contact therewith, there is considerable danger of scratching both the strip and the rolls.

Steel strip from which it may be desired completely to remove the scale by means of a brushing operation may ordinarily range in thickness from .030 inch up to to about .250 inch, and it will accordingly be necessary to provide rolls of the proper dimensions to process these various thicknesses of strip. Utilizing a six-roll assembly such as that shown in Fig. 9 or preferably that of Fig. 11 to handle low carbon, hot rolled steel strip .080 inch to .250 inch thick, the small idler work roll 21 may have a diameter of from about 1¼ inches to 2 inches, and less desirably, 3 inches. The intermediate back-up roll 20 or 20A should have a diameter only slightly greater than that of work roll 21, on the order of 2½ inches for a work roll having a diameter of from 1¼ inches to 2 inches. The power driven back-up rolls 57, 58 and 57A, 58A will, of course, be of considerably larger diameter, their exact dimensions not being critical although they must engage and support the intermediate back-up roll without interfering with the strip. The power driven work rolls 24 and 25 will be about 6⅜ inches in diameter.

In a similar roll arrangement designed to handle low carbon, hot rolled steel strip .050 inch to .080 inch thick, the small work roll 21 will have a diameter of from about ¾ inch to 1 inch, and the intermediate back-up roll 20, 20A will have a diameter of about 1¾ inches. The large power driven work rolls will have a diameter of about 4 inches.

When quite thin low carbon, hot rolled steel strip .030 inch to .050 inch thick is to be handled by a similar roll assembly, the small work roll 21 may have a diameter of from ½ inch to 1 inch and the intermediate back-up roll 20, 20A may have a diameter of 1¼ inches. The large work rolls 24 and 25 may then have a diameter of about 2¾ inches.

These three arrangements are in themselves complete units consisting of their respective rolls, bearings and chocks completely assembled, and any one of the three units may readily be removed from the roll stand and quickly replaced by another unit of the proper size for the strip to be processed. Such unit arrangements permit very accurate alignment of the parts when out of the housing. Of course, as indicated above, at least two successive roll stands will ordinarily be provided for flexing the strip in opposite directions. It has been found that the bearings for the small work roll 21 and the intermediate back-up roll may advantageously be lubricated by a lubricant spray or mist.

Of course, the rolls, and especially small work roll 21, gradually wear and must occasionally be reground. As will be seen from an inspection of Figs. 12–14 of the drawing, such small work roll and its intermediate back-up roll may be so journaled that the bearings may be adjusted to accommodate substantial change in roll diameters. Of course, the small work roll diameter should not be less than the minimum distance between the peripheries of the two large work rolls (i.e., the sum of the diameters of one large work roll and of such small work roll should not be as great as the distance between the centers of the two large work rolls).

Other modes of applying the principle of the invention may be employed, change being made as regards the details described, provided the features stated in any of the following claims or the equivalent of such be employed.

I therefore particularly point out and distinctly claim as my invention:

1. In mechanism for sharply flexing metal strip and the like, a stand, a back-up roll journalled in said stand, power means operative to drive said roll, a parallel smaller diameter intermediate roll freely rotatably supported against said back-up roll, a parallel still smaller diameter work roll freely rotatably supported against said intermediate roll, a pair of parallel larger work rolls slightly spaced from said smaller work roll, and means for driving said larger work rolls.

2. The mechanism of claim 1, wherein said smaller work roll is interposed between said larger work rolls.

3. The mechanism of claim 1, wherein said smaller work roll is entirely interposed between said larger work rolls but lies entirely to one side of the plane through the two axes of said latter work rolls on the side toward said supporting rolls.

4. The mechanism of claim 1, wherein said smaller work roll is entirely interposed between said larger work rolls but lies entirely to one side of the plane through the two axes of said latter work rolls on the side toward said supporting rolls, the axes of said smaller work roll and its supporting rolls lying in a common plane disposed at an angle to the direction of travel of work through the machine.

5. The mechanism of claim 1, wherein said smaller work roll is entirely interposed between said larger work rolls but lies entirely to one side of the plane through the two axes of said latter work rolls on the side toward said supporting rolls, the axes of said supporting rolls being offset relative to the direction of travel of work through the machine, with the axis of said back-up roll being more offset in such direction of travel than the axis of said intermediate roll.

6. The mechanism of claim 1, wherein said smaller work roll and its supporting rolls as a group, and said larger work rolls as a group, are mounted for relative movement toward and away from each other to interpose said smaller work roll between said larger work rolls and to withdraw the same.

7. Mechanism for sharply flexing metal strip and the like comprising a stand, a back-up roll journalled in said stand, means operative to drive said roll at a predetermined rate of speed, a parallel smaller diameter intermediate roll freely rotatably journalled in said stand and mounted for ready removal therefrom, said intermediate roll contacting said back-up roll to be driven thereby, a still smaller diameter parallel work roll freely rotatably journalled in said stand and mounted for ready removal therefrom, said work roll contacting said intermediate roll and adapted to be driven thereby, a pair of larger parallel work rolls slightly spaced from said smaller work roll on each side of the latter respectively with said smaller work roll lying entirely to one side of the plane common to the two axes of said larger work rolls on the side toward said back-up and intermediate rolls, means operative to drive said two larger work rolls at a predetermined rate of speed, and means operative to shift said larger work rolls relative to said smaller work roll to flex work passing therebetween and to disengage said rolls from such work.

8. The mechanism of claim 7, wherein said two larger work rolls are spaced apart a distance only slightly less than the diameter of said smaller work roll.

9. The mechanism of claim 7, wherein said two larger work rolls are spaced apart only slightly out of contact with each other.

10. The mechanism of claim 7, including power driven cylindrical rotary brushes mounted to brush the surfaces of said back-up roll and said larger work rolls.

11. The mechanism of claim 7, including power driven cylindrical rotary brushes mounted to brush the surfaces of said back-up roll and said larger work rolls, and a shoe interposed between said larger work rolls on the side away from said smaller work roll to prevent particles dislodged from said larger work rolls from dropping down therebetween onto the upper surface of the work.

12. In mechanism for sharply flexing metal strip and the like, a pair of parallel large diameter work rolls journalled a short distance apart out of contact with each other, a parallel much smaller diameter work roll journalled therebetween slightly spaced from said larger rolls and lying entirely within the region defined between the portions of the arcuate surfaces of said larger work rolls extending from a plane common to the respective axes of the latter to a plane tangent to the surfaces of both said larger work rolls on the side adjacent which said smaller roll is located.

13. The mechanism of claim 12, wherein said smaller work roll is of greater diameter than the clearance between said larger work rolls.

14. In mechanism for sharply flexing metal strip and the like, a pair of parallel large diameter work rolls journalled a short distance apart out of contact with each other, a parallel much smaller diameter work roll journalled therebetween slightly spaced from said larger rolls and having its axis within the region defined between the portions of the arcuate surfaces of said larger work rolls extending from a plane common to the respective axes of the latter to a plane tangent to the surfaces of both rolls on the side adjacent which said smaller roll is located, the surface of said smaller work roll lying entirely on the side of said latter plane toward said larger work rolls.

15. The mechanism of claim 14, wherein said smaller work roll is of greater diameter than the clearance between said larger work rolls.

16. In mechanism for sharply flexing traveling metal strip and the like, a support, two spaced parallel large diameter work rolls carried by said support, a much smaller diameter work roll carried by said support parallel to and slightly spaced from said two large rolls, whereby such strip may be passed between said small roll and two large rolls to flex the same over said small roll, a back-up roll for said small roll offset in the direction of travel of such strip, a larger back-up roll for said first back-up roll, and means for power driving said two large work rolls and said larger back-up roll only.

17. In mechanism for sharply flexing traveling metal strip and the like, a support, two spaced parallel large diameter work rolls carried by said support, a much smaller diameter work roll carried by said support parallel to and slightly spaced from said two large rolls, whereby such strip may be passed between said small roll and two large rolls to flex the same over said small roll, a back-up roll for said small roll offset in the direction of travel of such strip, a pair of back-up rolls together supporting said aforementioned back-up roll, and means for power driving said two large work rolls and said pair of back-up rolls only.

18. In mechanism for flexing a traveling metal strip or the like, parallel opposed work rolls between which such strip is adapted to pass, a back-up roll for one said work roll, floating bearing means for said latter work roll and resiliently deformable means laterally supporting said floating bearing means.

19. In mechanism for flexing a traveling metal strip or the like, a pair of spaced parallel large diameter work rolls, a much smaller diameter work roll carried by floating bearing means parallel to and slightly spaced from said two large diameter work rolls, whereby such strip may be passed between said small roll and said two large rolls to flex the same over said small roll, a back-up roll for said small roll, and resiliently deformable means laterally supporting said floating bearing means.

20. In mechanism for flexing a traveling metal strip or the like, a pair of spaced parallel large diameter work rolls, a much smaller diameter work roll carried by floating bearing means parallel to and slightly spaced from said two large diameter work rolls, whereby such strip may be passed between said small roll and said two large rolls to flex the same over said small roll, a back-up roll for said small roll, and resiliently deformable means supporting said floating bearing means for limited movement generally parallel to the pass line of such strip and also for limited movement toward and away from the bearing means journalling said back-up roll.

21. In mechanism for flexing a traveling metal strip or the like, a pair of spaced parallel large diameter work rolls, a much smaller diameter work roll carried by floating bearing means parallel to and slightly spaced from said two large diameter work rolls, whereby such strip may be passed between said small roll and said two large rolls to flex the same over said small roll, and resiliently deformable means laterally supporting said floating bearing means.

22. In mechanism for sharply flexing metal strip and the like, a pair of parallel large diameter work rolls journalled a short distance apart out of contact with each other, a parallel much smaller diameter work roll journalled therebetween slightly spaced from said larger rolls and lying entirely within the region defined between the portions of the arcuate surfaces of said larger work rolls extending from a plane common to the respective axes of the latter to a plane tangent to the surfaces of both rolls on the side adjacent which said smaller roll is located, said rolls being relatively proportioned and disposed to bring each said large work roll into engagement with such strip along an arc on the order of 70° and said interposed small work roll into engagement with such strip along an arc on the order of 140°.

23. In mechanism for sharply flexing metal strip and the like, a pair of parallel large diameter work rolls journalled a short distance apart out of contact with each other, a parallel much smaller diameter work roll journalled therebetween slightly spaced from said larger rolls and lying entirely within the region defined between the portions of the arcuate surfaces of said larger work rolls extending from a plane common to the respective axes of the latter to a plane tangent to the surfaces of both rolls on the side adjacent which said smaller roll is located, said rolls being relatively proportioned and disposed to bring said small work roll into engagement with such strip along an arc subtending an angle equal to the sum of the angles subtended by the arcs of contact between such strip and said two large work rolls.

24. In mechanism for sharply flexing traveling metal strip and the like, a support, a large diameter work roll carried by said support, a much smaller diameter work roll carried by said support parallel to said large roll and slightly spaced therefrom in cooperative association, a roll disposed to deflect such strip over said small roll for passage between the latter and said large roll, a back-up roll for said small roll offset in the direction of travel of such strip to support said small roll in conjunction with said large roll, a larger back-up roll for said aforementioned back-up roll, and power means for driving only said larger back-up roll to drive said small work roll through frictional engagement with the aforementioned intermediate back-up roll.

25. In mechanism for sharply flexing metal strip and the like, a stand, a back-up roll journalled in said stand, power means operative to drive said roll, a parallel smaller diameter intermediate roll freely rotatably supported against said back-up roll, a parallel still smaller diameter work roll freely rotatably supported against said intermediate roll, a pair of parallel larger work rolls slightly spaced from said smaller work roll, and means for driving said larger work rolls, said larger work rolls having their axes positioned circumferentially of said smaller work roll to wrap such metal strip on said smaller work roll through an arc on the order of 140°.

References Cited in the file of this patent

UNITED STATES PATENTS

| | | |
|---|---|---|
| 1,047,335 | Thurston | Dec. 17, 1912 |
| 2,004,596 | Biggert | June 11, 1935 |
| 2,108,746 | Erichsen | Feb. 15, 1938 |
| 2,226,500 | Matthews | Dec. 24, 1940 |
| 2,234,153 | Herbert | Mar. 4, 1941 |
| 2,256,520 | Johansen | Sept. 23, 1941 |
| 2,282,770 | Sarver | May 12, 1942 |
| 2,391,499 | Yoder | Dec. 25, 1945 |
| 2,403,374 | Kalmar | July 2, 1946 |
| 2,776,586 | Sendzimir | Jan. 8, 1957 |

FOREIGN PATENTS

| | | |
|---|---|---|
| 619,820 | Germany | Jan. 25, 1934 |